No. 670,372. Patented Mar. 19, 1901.
J. A. JUST.
PROCESS OF PRODUCING CASEIN PRODUCTS.
(Application filed Jan. 13, 1898. Renewed June 30, 1900.)
(No Model.)
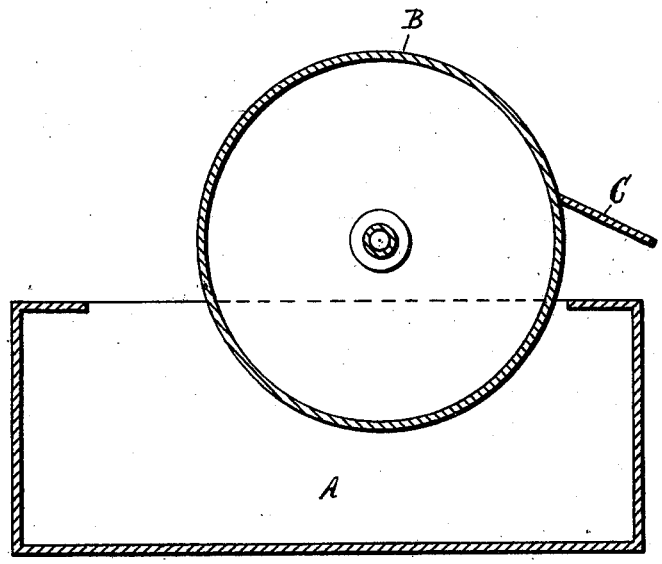
WITNESSES:
M. D. Lewis.
H. E. Chase.
INVENTOR
John A. Just.
BY
Hey & Parsons.
ATTORNEYS.

UNITED STATES PATENT OFFICE.

JOHN A. JUST, OF SYRACUSE, NEW YORK, ASSIGNOR OF THREE-FIFTHS TO WILLIAM D. CARPENTER, OF SAME PLACE.

PROCESS OF PRODUCING CASEIN PRODUCTS.

SPECIFICATION forming part of Letters Patent No. 670,372, dated March 19, 1901.

Application filed January 13, 1898. Renewed June 30, 1900. Serial No. 22,203. (No specimens.)

*To all whom it may concern:*

Be it known that I, JOHN A. JUST, a citizen of the United States, residing at the city of Syracuse, in the county of Onondaga and State of New York, have invented a Process of Producing Casein Products, of which the following is a specification.

My invention relates to the production of a dry soluble casein product from the casein of milk.

The object of my invention is to produce a casein product which is very light and perfectly soluble in water and which has other desirable properties and to produce such product by a simple, direct, and inexpensive method of manufacture.

Heretofore soluble casein powders have been produced from casein solutions by various methods, all of which are complicated and expensive—for instance, by evaporating the solution *in vacuo* precipitating the soluble casein by absolute alcohol, and drying and grinding the powder; also, by drying the solution in a current of carbon dioxid. Casein solutions made in the well-known way—for instance, by means of sodium bicarbonate—are of a sticky or gummy nature and become discolored and more or less decomposed when heated to the boiling-point or thereabout in a body. Hence such solutions have been evaporated *in vacuo* which is a very slow and unsatisfactory method. The soluble casein powders heretofore produced have been comparatively heavy and dense and of a pulverulent or granular and gritty nature, which causes such powders to pack closely in water, whereby the solubility and digestibility of these powders are impaired and their use as foods or ingredients of food preparations is interfered with. I have discovered that by drying a casein solution in a thin film at a temperature which is sufficiently high to cause an almost instantaneous expulsion of the free water contained in the solution a casein product is produced which differs materially from the prior existing casein powders in physical properties, and probably also in the percentage of combined water which it contains.

In practicing my invention a casein solution is formed from milk casein in any suitable way—for instance, by dissolving casein in a watery solution of bicarbonate of soda. This solution is then dried in a thin film upon a surface which is heated to such a high temperature that the heat acting upon the thin film of the solution expels the free water contained therein very quickly, almost instantaneously. This method of drying effectually dries the film without affecting the color of the product or causing any decomposition or other undesirable change in the casein. This method of drying can be carried on successfully under atmospheric pressure at a temperature of from 212° to 220° Fahrenheit on any suitable or well-known drying apparatus having a rotary steam-heated surface upon which the solution is distributed in a thin film.

The accompanying drawing is a vertical section illustrating the general features of such a drying apparatus which can be used for practicing this process.

A represents the receptacle for the casein solution.

B is a hollow cylinder which dips with the lower portion of its peripheral face into the solution in the receptacle A. This cylinder is heated by steam, so that its face has a temperature of from 212° to 220° Fahrenheit. The cylinder rotates and carries a thin film of the solution upwardly on its ascending side.

C is a scraper arranged on the descending side of the cylinder for removing the dried material from the peripheral face thereof.

The casein product produced by this method is a white, practically tasteless, and odorless substance somewhat crystalline in appearance and of an extremely light, loose, fluffy, or highly-porous structure. It is from six to ten times lighter than the same bulk of water. It does not pack closely under moderate pressure, but is resilient and retains its fluffy character. It dissolves readily in water, forming a slightly-opalescent solution. There is no coagulating on boiling. On addition of hydrochloric acid the casein is precipitated from such a solution in the form of a soft curd, which is remarkably digestible in fluid pepsin.

By reason of its fluffy character and large bulk a comparatively small proportion of this casein product can be readily and thoroughly mixed with other ingredients in making food preparations—for instance, with flour for making bread—and this thorough, minute, and uniform distribution of the casein through the mass of the material with which it is mixed causes a corresponding uniform and thorough distribution of the moisture which is absorbed by the casein.

I do not wish to claim in this application the casein product produced by the method herein claimed. This product is claimed in a divisional application filed on the 14th day of January, 1901, Serial No. 43,111.

I claim as my invention—

1. The herein-described process of producing a fluffy, porous casein product, which consists in subjecting a thin film of a casein solution to heat at a temperature in excess of 212° Fahrenheit and at atmospheric pressure, substantially as specified.

2. The herein-described process of producing a casein product, which consists in drawing from a casein solution a thin film of said solution, and subjecting said film to heat at a temperature in excess of 212° Fahrenheit for a sufficient length of time to produce a fluffy, porous product, substantially as specified.

3. The herein-described process of producing a fluffy and highly-porous casein product, which consists in drawing from a casein solution a thin film of such solution and subjecting said film under atmospheric pressure to a temperature of not less than 212° Fahrenheit, substantially as set forth.

In testimony whereof I have hereunto signed my name, in the presence of two attesting witnesses, at Syracuse, in the county of Onondaga, in the State of New York, this 4th day of January, 1898.

JOHN A. JUST.

Witnesses:
K. H. THEOBALD,
D. LAVINE.